United States Patent [19]

Kobylinski et al.

[11] 3,907,968

[45] *Sept. 23, 1975

[54] PROCESS FOR REDUCING THE CONTENT OF NITROGEN OXIDES IN A GASEOUS MIXTURE CONTAINING THE SAME

[75] Inventors: Thaddeus P. Kobylinski, Cheswick; Brian W. Taylor, Gibsonia, both of Pa.

[73] Assignee: Gulf Research & Development Company, Pittsburgh, Pa.

[ * ] Notice: The portion of the term of this patent subsequent to Jan. 8, 1991, has been disclaimed.

[22] Filed: Dec. 29, 1972

[21] Appl. No.: 319,359

[52] U.S. Cl. ............ 423/213.5; 423/213.7; 60/301
[51] Int. Cl.² ......................................... B01D 53/34
[58] Field of Search............ 423/213.5, 213.7, 239; 60/301; 252/466, 472, 474, 462

[56] References Cited
UNITED STATES PATENTS

| | | | |
|---|---|---|---|
| 3,055,840 | 9/1962 | Koch | 252/466 |
| 3,118,727 | 1/1964 | Cohn | 423/239 |
| 3,317,439 | 5/1967 | Stiles | 423/213.5 X |
| 3,637,344 | 1/1971 | Thompson | 423/213.7 |
| 3,662,540 | 12/1970 | Murphey | 423/213.7 X |
| 3,819,536 | 1/1974 | Betta et al. | 252/462 |
| 3,835,069 | 9/1974 | Ganohi et al. | 252/462 |

OTHER PUBLICATIONS

"Chemical Engineering"; May 29, 1972; p. 30.

*Primary Examiner*—G. O. Peters

[57] ABSTRACT

A method is proposed for the reduction of nitrogen oxides in a gaseous mixture containing the same, particularly in exhaust gases from internal combustion engines, to selectively form nitrogen as substantially the only nitrogen-containing product. The method comprises contacting a nitrogen-oxide containing gaseous mixture at an elevated temperature in a reducing atmosphere with a metal ruthenate.

18 Claims, No Drawings

PROCESS FOR REDUCING THE CONTENT OF NITROGEN OXIDES IN A GASEOUS MIXTURE CONTAINING THE SAME

In our Application Ser. No. 207,545 now U.S. Pat. 3,784,675 filed Dec. 13, 1971, we have disclosed and claimed a process for the reduction of nitrogen oxides in exhaust gases from internal combustion engines to selectively form nitrogen as substantially the only nitrogen-containing product by contacting such gases at elevated temperatures in a reducing atmosphere with selected amounts of ruthenium.

The treated gases are then contacted in a second stage with an oxidation catalyst, such as platinum, under oxidation conditions to convert unburned hydrocarbons and carbon monoxide to carbon dioxide and water. Since the second stage is further removed from the engine than the first, it will reach operative temperature levels later than the first. Accordingly, during the initial stages of operation, for example, from about 20 seconds to about 20 minutes after start-up, unburned hydrocarbons and carbon monoxide will not be satisfactorily oxidized in the second stage until adequate oxidation temperature levels are reached therein.

The first stage containing ruthenium can be used for oxidation during the initial stages of operation to provide a satisfactory solution to the problem. For example, during the initial stages of operation, oxygen can be introduced into the first stage in amounts sufficient to create an oxidation atmosphere therein so that oxidation of unburned hydrocarbons and carbon monoxide takes place in the presence of ruthenium therein. Since operation of the engine during the initial stages is under closed choke with a rich fuel mixture, nitrogen oxide emissions are low and no urgency exists to convert whatever nitrogen oxides are produced to nitrogen. After initial operation, the temperature in the second state will quickly reach oxidation temperature levels. Then the oxygen flow is terminated to the first stage reactor but is made to the second stage oxidation reactor. Thereafter reducing conditions are maintained in the first stage and oxidation in the second and each stage then functions in its intended manner. Occasionally, too, perhaps because of some malfunction, excess oxygen can be present in the gases entering the first stage reactor sufficient to create, temporarily, an oxidizing atmosphere therein.

Industrial gases containing nitrogen oxides can also be treated with ruthenium and added fuel at elevated temperatures in a reducing atmosphere to convert the nitrogen oxides selectively to nitrogen as substantially the only nitrogen-containing product. Examples of these gases are coke oven gases and waste or tail gases from the oxidation of ammonia to produce nitric acid. Here, too, the amount of oxygen in the gaseous mixture may occasionally rise to a level sufficient to create an oxidizing atmosphere in the treating zone.

We have found that in all such cases wherein ruthenium is subjected to an oxidizing atmosphere, ruthenium has a tendency to volatilize, perhaps as ruthenium oxides, for example, as $RuO_3$ and $RuO_4$, known to be highly volatile and toxic, which can then escape from the reaction zone with the exit gases. Depletion of ruthenium, especially since it is an expensive metal, is detrimental to continued operation of the first stage reactor. In addition, since it is believed that ruthenium oxides may be toxic, its escape into the atmosphere is obviously undesirable and harmful.

We have found that if certain selected ruthenates are employed in place of ruthenium in said Application Ser. No. 207,545 the volatility problems referred to above are overcome and yet the desired conversion of nitrogen oxides to nitrogen as substantially the only nitrogen-containing product, without the formation of appreciable amounts of ammonia, is still obtained. The ability of the ruthenates to function as reducing catalysts herein is not appreciably affected by their being subjected to intermittent or prolongned oxidizing atmospheres.

The gas mixtures of primary interest for treatment in accordance with the process of this invention are those gas mixtures produced by the combustion of a hydrocarbon fuel using air, such as the exhaust gases from an internal combustion engine utilizing a hydrocarbon-type fuel. By "an internal combustion engine" we mean to include an engine having a combustion chamber wherein a hydrocarbon fuel is burned with molecular oxygen and the products of combustion are used to drive moving parts, such as a piston, rotors, etc. These hydrocarbon fuel exhaust gases contain small concentrations of NO and $NO_2$ where usually the mol ratio of NO to $NO_2$ exceeds 1:1.

An automobile exhaust gas that can be treated in accordance with the process defined and claimed herein would have a composition whose major components would be as shown in Table I below:

Table I

| Components | Broad Range, Mol Per Cent | Usual Range, Mol Per Cent |
|---|---|---|
| 1) $NO_x$, where x is 1 or 2 | 50 to 5000 ppm[2] | 100 to 3500 ppm[2] |
| 2) Free molecular oxygen | 0 to 5 | 0.5 to 2 |
| 3) Free molecular hydrogen | 0.1 to 4 | 0.2 to 1 |
| 4) CO | 0.2 to 8 | 0.4 to 2 |
| 5) Hydrocarbons[1] | 0 to 4000 ppm[2] | 50 to 1000 ppm[2] |
| 6) $H_2O$ | 5 to 16 | 10 to 13 |
| 7) $CO_2$ | 5 to 16 | 10 to 13 |
| 8) Lead (as metal) | 0 to 12 ppm[2] | 0 to 4 ppm[2] |
| 9) Nitrogen | 53 to 89 | 68 to 78 |

[1] Calculated as carbon
[2] By volume

Coke oven gas that can be treated with the ruthenates herein could have a composition whose major components, except nitrogen, are shown in Table II. The remainder of these gases consist almost solely of nitrogen.

Table II

| Components | Broad Range Mol Per Cent | Usual Range, Mol Per Cent |
|---|---|---|
| 1) $H_2$ | 4 to 70 | 40 to 60 |
| 2) CO | 5 to 90 | 7 to 15 |
| 3) $O_2$ | 0 to 1 | 0.02 to 0.8 |
| 4) $CH_4$ | 0.5 to 40 | 20 to 35 |
| 5) $C_2H_4$ | 0.5 to 4 | 1 to 2 |
| 6) $C_2H_2$ | 0 to 1 | 0.1 to 0.3 |
| 7) $NO_x$, where x is 1 or 2 | 10 to 2000 ppm[1] | 20 to 500 ppm[1] |

[1] By Volume

Waste gases from the oxidation of ammonia to produce nitric acid that can also be treated herein with added fuel will have from about 0.05 to about 0.8 mol per cent $NO_x$, generally from about 0.1 to about 0.5 mol per cent $NO_x$, where x is 1 or 2, from about 1.0 to about 6.0 mol percent oxygen, generally from about 2.5 to about 4.2 mol percent oxygen, with the remainder being substantially all nitrogen and some water.

The catalysts used herein for converting nitrogen oxides to nitrogen as substantially the only nitrogen-containing compound are metal ruthenates selected from the group consisting of lithium, sodium, potassium, rubidium, cesium, calcium, strontium and barium ruthenates. By "ruthenate" we intend to include compounds and/or complexes wherein ruthenium can exist in chemical and/or complex relationship with lithium, sodium, potassium, rubidium, cesium, calcium, strontium or barium and oxygen. Since these ruthenates can exist with metals possessing a quadravalency state the ruthenate that can be employed herein can be defined, for example, as follows:

$$A_w M_x Ru_y O_z ,$$

wherein A is a metal selected from the group consisting of lithium, sodium, potassium, rubidium, cesium, calcium, strontium and barium; M is a metal selected from the group consisting of titanium, zirconium, hafnium, tin, germanium, lead, manganese, tellurium, molybdenum, vanadium, tungsten, cerium and praseodymium and $w$, $x$, $y$ and $z$ are integers defined as in the following Table III.

Table III

|   | Broad Range | Preferred Range | Most Preferred Range |
| --- | --- | --- | --- |
| w | 1 to 4 | 1 to 2 | 1 to 2 |
| x | 0 to 8.9 | 0 | 0 |
| y | 0.1 to 9 | 1 to 5 | 1 to 3 |
| z | 3 to 20 | 3 to 12 | 3 to 7 |

The ruthenates employed herein can be obtained in any convenient manner. For example, stoichiometric amounts of a mixture or mixed solutions of an oxide peroxide, carbonate, nitrate, acetate, chloride, bromide or hydroxide of metal A and ruthenium metal or stoichiometric amounts of a mixture of an oxide, peroxide, carbonate, nitrate, acetate, chloride, bromide or hydroxide of metal A, metal M and ruthenium can be calcined in air at a temperature in excess of about 550°C., for example, about 1,000° to about 1,500°C., for a period of about one to about 24 hours to obtain a ruthenate falling within the definition set forth above and which can be used herein.

Specific examples of metal ruthenates that can be used herein include the following: $BaRuO_3$, $BaRu_2O_5$, $BaRu_3O_7$, $BaRu_4O_9$, $Ba_2Ru_5O_{12}$, $Ba_2Ru_9O_{20}$, $BaTi_{0.5}Ru_{0.5}O_3$, $BaTi_{0.25}Ru_{0.75}O_3$, $BaTiO_{0.75}Ru_{0.25}O_3$, $BaTiRuO_5$, $BaTi_2RuO_7$, $BaTiRu_2O_7$, $BaTi_3RuO_9$, $BaTi_2Ru_2O_9$, $Ba_2Ti_2Ru_3O_{12}$, $Ba_2TiRu_4O_{12}$, $Ba_2Ti_8O_{20}$, $Ba_2Ti_4Ru_5O_{20}$, and compounds identical to these but wherein barium is replaced with lithium, sodium, potassium, rubidium, cesium, calcium or strontium and titanium is replaced with zirconium, hafnium, tin, germanium, lead, manganese, tellurium, molybdenum, vanadium, tungsten, cerium or praseodymium and combinations thereof.

The metal ruthenate defined above can be used in its unsupported form, but in a preferred embodiment is suitably distended on a support. The amount of metal ruthenate on the support can be, for example, from about 0.1 to about 10 weight per cent of the support, but is usually and preferably from about 0.05 to about one weight per cent of the support.

The support for the metal ruthenate catalysts to be used in the process of this invention can be any of the refractory oxide supports well-known in the art, such as those prepared from alumina, silica, magnesia, thoria, titania, zirconia, silica-aluminas, silica-zirconias, magnesia-aluminas, etc. In addition, the support can be an activated carbon, pumice, etc. Other suitable supports include the naturally-occurring clays, such as diatomaceous earth. In general, the surface area of these supports can be from about 10m² to about 500m² per gram, preferably from about 50m² to about 300m² per gram. Additional desirable supports for use herein are the more-recently developed corrugated ceramic materials made, for example, from alumina, silica and magnesia, lithium, etc. An example of such ceramic material is Therma Comb made by American Lava Corporation, Chattanooga, Tennessee, which is more fully described in U.S. Pat. No. 3,444,925. If desired, the $A_w M_x Ru_y O_z$ can be mounted directly onto the surface of the ceramic material, the ceramic material can first be coated with a refractory oxide, such as defined above, prior to the deposition of $A_w M_x Ru_y O_z$ thereon or $A_w M_x Ru_y O_z$ can be combined with the refractory oxide and the result combination can then be deposited on the ceramic material. The ceramic materials per se have a low surface area and high heat stability, and the addition of the refractory oxide coating increases the surface area to a more desirable range. In addition, these coated ceramics possess the further advantage of being easily formed in one piece. Very little, if any, pressure drop is experienced by the passage of exhaust gases through such ceramic materials.

Any suitable method well-known to those having ordinary skill in the art can be employed in the preparation of the supported metal ruthenate catalyst used herein. For example, the metal ruthenate in the form of a fine powder can be ball-milled over a period of about one hour with gamma alumina to prepare a gamma alumina carrying the metal ruthenate on the surface thereof. Similarly, spherical gamma alumina carrying a metal ruthenate can be prepared by rotating powdered metal ruthenate for about six hours with spherical gamma alumina. Additionally, the support can be impregnated with a solution of compatible salts that are precursors to the metal ruthenates, followed by high temperature calcination in air.

In order to selectively reduce substantially all of the nitrogen oxides in the gaseous mixtures to be treated herein to form nitrogen as substantially the only nitrogen-containing compound, without the formation of significant amounts of ammonia, we simply pass such gaseous mixtures into contact with one or any combination of metal ruthenates defined hereinabove at elevated temperatures in a reducing atmosphere. By "substantially all of the nitrogen oxides" we mean that at least about 75 mol percent of the nitrogen oxides are converted herein, preferably at least about 85 mol percent, but most preferably at least about 90 mol percent. In general, by following the procedure defined herein no more than about nine weight per cent of the nitrogen oxides in the gaseous mixture to be treated are converted to ammonia, but in most instances less than about three weight per cent are converted to ammonia.

In order to convert substantially all of the nitrogen oxides in the gaseous mixtures to be treated herein to form nitrogen as substantially the only nitrogen-containing compound, without the formation of ammonia, it is imperative that the ruthenate be used in catalytically effective amounts. For example, the metal ruthenate is used in an amount such that the ruthenium component thereof, as metal, is present in the range of about 0.003 to about 0.5 Troy ounce of ruthenium per 1000 cubic feet of gas being treated per hour, preferably from about 0.008 to about 0.3 Troy ounce of ruthenium per 1000 cubic feet of gas being treated per hour, but most preferably from about 0.01 to about 0.2 Troy ounce of ruthenium per 1,000 cubic feet of gas being treated per hour. In general, for example, during idling an internal combustion engine, particularly of the automotive type, can produce as low as about 600 cubic feed per hour of exhaust gas and at extremely high speeds, for example, at speeds in excess of about 60 miles per hour, can produce as high as about 12,000 cubic feet per hour of exhaust gas, but in general from about 1,500 to about 8,000 cubic feet per hour of exhaust gas will be produced at speeds below about 60 miles per hour.

A critical requirement to obtain conversion of nitrogen oxides herein is that an effective reducing atmosphere be maintained in the reaction zone. The concentration of molecular oxygen in the gaseous mixture being treated has no adverse effect on the metal ruthenate catalyst, as used herein, provided a reducing atmosphere is maintained during the reaction. By "reducing atmosphere" we mean an atmosphere wherin the stoichiometric ratio of molecular oxygen to the reducing agents in the reaction zone is less than 1:1, preferably about 0.9:1 or less. By "stoichiometric ratio of molecular oxygen to the reducing agents" we means the amount of oxygen stoichiometrically required to convert the reducing agent or agents to their higher oxidation states. By "reducing agent" we mean to include substances which can be oxidized in the reaction zone by molecular oxygen, for example, substances such as hydrogen and carbon monoxide which can be converted to water and carbon dioxide, respectively.

The temperature required for the desired reduction herein can be varied over wide limits. Thus, the temperature can be as low as 475° F. and as high as about 2,200° F., or even higher, but in general we prefer to employ a temperature in the range of about 800° to 1,400° F.

The reaction pressure is not critical and suitable pressures of about 0 to about 150 pounds per square inch gauge are satisfactory, but, preferably, the pressure is about atmospheric or slightly above.

The metal ruthenate employed herein can be employed at both high and low gas hourly space velocities (GHSV); i.e., at about 8,000 to about 200,000, or even higher, volumes of gas per hour per volume of catalyst. Here, as elsewhere in this specification, volumes are defined as being standard conditions, that is, 760 mm Hg and 0° C.

The metal ruthenate catalyst is, of course, primarily meant to be utilized as part of a reactor system to be attached at any suitable location in the exhaust system of an automobile. The temperature of the reactor system can suitably be regulated to the desired temperature by the position of the reactor with respect to the gases exiting from the internal combustion engine. The further from the engine the reactor is placed, the cooler will be the gases entering the reactor. It may also be desirable to utilize some of the exhaust gases initially to preheat the reactor catalyst chamber before the gases enter into the catalyst chamber. A suitable means of doing this could be that described by Meguerian and Lange in the Paper "$NO_x$ Reduction Catalysts For Vehicle Emission Control", published by the Society of Automotive Engineers, Inc. and presented as part of the Automotive Engineering Congress Meeting in Detroit, Michigan on Jan. 11–15, 1971.

It is also important with automotive exhaust gases to not only remove nitrogen oxides but also to remove unburned hydrocarbons and carbon monoxide. The removal of the unburned hydrocarbon and carbon monoxide can easily be achieved by an oxidation reaction using known catalysts under known oxidizing conditions. This oxidation must occur, however, in the substantial absence of ammonia, since ammonia will quickly reoxidize to form undesirable nitrogen oxides. As will be shown hereinafter, no appreciable conversion of hydrocarbons or carbon monoxide occurs as a result of the water gas shift reaction under the reducing atmosphere employed here during treatment of the exhaust gases with ruthenium in accordance with the process defined and claimed herein. By the use of the metal ruthenate catalyst, utilizing the conditions as set forth herein, to obtain a product having substantially no ammonia, the product gases can then be oxidized in a second-stage converter utilizing oxidation catalysts, which are well-known in the art, under oxidation conditions to oxidize any unburned hydrocarbons and carbon monoxide to non-polluting gases such as carbon dioxide and water. Usually combustion air is pressurized into the $NO_x$-free gases at a flow rate such that the average temperature of the catalyst bed is maintained at a level from about 800° to about 1,700° F., preferably a temperature of 900° to 1,100° F. Any of the metals of Group VIII, for example, platinum, palladium, etc. can successfully be employed in the oxidation of unburned hydrocarbons and CO to produce $CO_2$ and water in the presence of a combustion gas such as air. In addition, copper, vanadium or chromium-containing catalysts can also be used. Similarly, the metal ruthenates disclosed herein can also be used in the oxidation stage. The metals are usually distended on a support which can be the same as the supports described above for use with the ruthenium catalyst. Other typical oxidation catalysts, conditions and operational procedures can be the same as described in U.S. Pat. No. 3,503,715 to Haensel and the teachings of this patent are incorporated herein by reference. Still another procedure for the oxidation of unburned hydrocarbons and CO with molecular oxygen in the presence of oxidation catalysts, including ruthenium, is claimed in U.S. Pat. No. 3,257,163 to Stiles.

The invention will be further described with reference to the following experimental work.

EXPERIMENT 1

1.01 grams of powdered ruthenium metal was mixed with 1.69 grams of $BaO_2$, the molar ratio of ruthenium metal to barium metal being 1:1. The powdered mixture was calcined in air for a period of 12 hours at 1,000° C. The resulting blue-black sintered particles were found to consist of the pure compound $BaRuO_3$.

A number of additional experiments was carried out using selected ruthenium compounds and barium compounds to prepare $BaRuO_3$. In each case equal molar amounts of the two compounds were mixed and the mixture was calcined in air for a period of 12 hours at 1,000° C. The tests are summarized below in Table IV.

Table IV

| Exp. No. | Ruthenium Compound | Grams | Barium Compound | Grams |
|---|---|---|---|---|
| 2 | $RuO_2$ | 1.33 | BaO | 1.53 |
| 3 | $RuO_2$ | 1.33 | $Ba(OH)_2$ | 1.71 |
| 4 | $RuO_2$ | 1.33 | $BaCl_2$ | 2.08 |
| 5 | $RuCl_3$ | 2.07 | $BaCl_2$ | 2.08 |
| 6 | $RuCl_3$ | 2.07 | $Ba(NO_3)_2$ | 2.61 |
| 7 | $RuCl_3$ | 2.07 | $Ba(CH_3COO)_2$ | 2.55 |
| 8 | $Ru(NO_3)_3$ | 2.80 | $Ba(CH_3COO)_2$ | 2.55 |
| 9 | $Ru(NO_3)_3$ | 2.80 | $Ba(CO_3)_2$ | 1.97 |
| 10 | $RuO_2$ | 1.33 | $Ba(CO_3)_2$ | 1.97 |

EXPERIMENT 11

2.07 grams of $RuCl_2$ and 2.00 grams of $Ba(OH)_2$ were dissolved in water until the resultant solution contained 15 weight percent of each salt. The solutions were mixed and then evaporated to dryness and the residue was then calcined in air at 1,000° C. for 16 hours to produce sintered particles of $BaRuO_3$.

EXPERIMENT 12

0.3 grams of $BaRuO_3$ in the form of a fine powder prepared as in Experiment 1 was ball-milled over a period of one hour with 100 grams of gamma alumina having the following characteristics: 1/16 inch diameter, 190 m²/gram surface area, 0.80 cc/gram pore volume, an average pore diameter of 185A. The resultant alumina carrying the barium ruthenate thereon was then formed into discs having a diameter of one inch and a thickness of ⅛ inch. The resulting catalyst contained 0.1 weight percent of ruthenium as metal. The cylinders were crushed and then sized through a 20–40 mesh sieve. Density of the catalyst bed was 0.5 gram per cc.

EXPERIMENT 13

$BaRuO_3$ prepared as in Experiment 1 was powdered in a mortar and then rotated over a period of one hour with spherical alumina having a diameter of 1/16 inch but with remaining characteristics as those in Experiment 12. Depending upon the amounts of barium ruthenate and alumina used, spherical catalysts were obtained containing from 0.05 to 0.5 weight percent ruthenium, as metal.

A series of experiments was carried out wherein a gas containing 0.5 mol percent NO, 2.0 mol percent CO, 2.0 mol percent $H_2$ and 95.5 mol percent $Ar_2$ was passed over five grams of catalyst containing 11.2 weight percent $BaRuO_3$, prepared as above. The gas hourly space velocity (volume of gas per hour per volume ruthenium metal) was 36,000. Here, as well as elsewhere herein, space velocity is at standard temperature and pressure. In each experiment 0.5 Troy ounce of ruthenium metal was thus present for each 1000 cubic feet of gas per hour. By "Troy ounce" we mean 31.1 grams of ruthenium metal. Each experiment was carried out over a period of 20 minutes. The results obtained are tabulated below in Table V.

Table V

| Exp. No. | Temp. °F. | Weight Per Cent NO Converted | Weight Per Cent NO Converted to $NH_3$ [1] |
|---|---|---|---|
| 14 | 360 | 0 | — |
| 15 | 410 | 5 | — |
| 16 | 450 | 62 | 2.1 |
| 17 | 480 | 91 | 5.2 |
| 18 | 520 | 100 | 9.2 |
| 19 | 700 | 100 | 2.0 |
| 20 | 910 | 100 | None |
| 21 | 1120 | 100 | None |

[1] Remainder converted to nitrogen

The above data show that at a temperature as low as 480°F. substantially all of the NO is converted with substantially all going to nitrogen. At 520°F. all of the NO is converted and yet the ammonia formed is not appreciably increased.

An additional series of experiments was carried out wherein a gaseous mixture containing 4,000 parts per million of NO, 2.5 mol percent CO, 1.0 mol percent $H_2$, 10 mol percent water, 11.0 mol percent $CO_2$ and 1,000 parts per million of propylene was passed over spherical gamma alumina prepared as in Experiment 13 carrying 0.3 weight percent $BaRuO_3$. The gas hourly space velocity (volume of gas per hour per volume of ruthenium metal) was 36,000. In each experiment 0.01 Troy ounce of ruthenium was thus present for each 1,000 cubic feet of gas per hour. Each experiment was carried out over a period of 20 minutes. The results are tabulated below in Table VI.

Table VI

| Exp. No. | Temp. °F. | Weight Per Cent NO Converted | Weight Per Cent NO Converted to $NH_3$ [1] |
|---|---|---|---|
| 22 | 500 | 95 | 7.2 |
| 23 | 600 | 100 | 3.2 |
| 24 | 800 | 100 | 1.0 |

[1] Remainder converted to nitrogen

The above shows that the supported catalyst of various concentrations are similarly effective herein to reduce substantially all of the NO without any appreciable amount of $NH_3$.

The experiments of Table VI were repeated, except that the temperature was maintained at 900°F. but at different space velocities. Conversion of NO was always 100 percent. The results are tabulated below in Table VII.

Table VII

| Exp. No. | GHSV | Troy Ounce of Ruthenium Metal Per 1000 Cubic Feet of Gas Per Hour | Weight Per Cent NO Converted to $NH_3$ [1] |
|---|---|---|---|
| 25 | 15,000 | 0.03 | 7.0 |
| 26 | 20,000 | 0.02 | 3.0 |
| 27 | 36,000 | 0.01 | 0.5 |
| 28 | 50,000 | 0.009 | None |
| 29 | 78,000 | 0.006 | None |

[1] Remainder converted to nitrogen

Table VII shows that the metal ruthenates are effective herein at both high and low gas hourly space velocities.

The experiments of Table VI were repeated but with varying amounts of $BaRuO_3$ prepared as in Experiment 13 and at a constant reaction temperature of 900°F. and a 36,000 GHSV. The results are tabulated below in Table VIII.

Table VIII

| Exp. No. | Weight Per Cent BaRuO₃ | Troy Ounce of Ruthenium Metal Per 1000 Cubic Feet of Gas Per Hour | Weight Per Cent NO Converted | Weight Per Cent NO Converted to NH₃ [1] |
|---|---|---|---|---|
| 30 | 0.1 | 0.004 | 100 | 0.5 |
| 31 | 0.2 | 0.008 | 100 | 0.5 |
| 32 | 0.5 | 0.020 | 100 | 1.0 |

[1] Remainder converted to nitrogen

A series of experiments was carried out to show that the metal ruthenates employed herein exhibit less weight loss than ruthenium when exposed to air. In each a barium ruthenate or ruthenium oxide was exposed to a flow of 0.63 cubic feet of air per hour at a temperature of 1,650°F. The amount of ruthenium present initially in each case, as metal, amounted to 500 milligrams. The data obtained are tabulated below in Table IX.

Table IX

| Exp. No. | Compound | Method Used In Preparing Compound | Average Weight Loss, Mg/Hour | Weight Loss Factor [1] |
|---|---|---|---|---|
| 33 | BaRuO₃ | Experiment 1 | 0.008 | 2.6 |
| 34 | BaRuO₃ | Experiment 7 | 0 | 0 |
| 35 | BaRuO₃ | Experiment 6 | 0.02 | 6.6 |
| 36 | RuO₂ | — | 0.3 | 100 |

[1] Weight loss factor — assume a weight loss of 0.3 milligrams per hour equals 100

Table IX clearly demonstrates that a metal ruthenate will volatilize to a far less extent when exposed to air than will ruthenium oxide.

To further show that metal ruthenates will not volatilize as readily as ruthenium when each is exposed to air an additional series of experiments was carried out. BaRuO₃ and RuO₂ were each exposed to the following cycle: 12 hours in flowing air, at a rate of 0.63 cubic feet per hour, at 1,600°F. and 15 minutes to nitrogen, at a rate of 0.63 cubic feet per hour, at a temperature of 1,000°F. and four hours to hydrogen, at a rate of 0.63 cubic feet per hour, at a temperature of 1,000°F. This cycle was repeated four times and a total weight loss was registered. The amount of material tested in each case was such that it initially contained 500 milligrams of ruthenium. The results are tabulated below in Table X.

Table X

| Exp. No. | Compound | Method Used In Preparing Compound | Total Weight Loss At End Of Four Cycles,Mg. | Weight Loss Factor [1] |
|---|---|---|---|---|
| 37 | BaRuO₃ | Experiment 1 | 0.45 | 3.87 |
| 38 | BaRuO₃ | Experiment 7 | 0.40 | 3.44 |
| 39 | RuO₂ | — | 11.60 | 100.0 |

[1] Weight Loss Factor — assume a weight loss of 11.60 milligrams equals 100

BaRuO₃ from Experiment 37 was mixed with gamma alumina spheres following the procedure of Experiment 13 to obtain an alumina carrying 0.28 weight percent BaRuO₃. A gas identical to that of Experiments 14 to 21 was passed over this catalyst at a GHSV of 36,000. This meant the gas was treated with 0.01 Troy ounce of ruthenium metal per 1,000 cubic feet per hour. The results obtained are tabulated below in Table XI.

Table XI

| Exp. No. | Temp. °F. | Weight Per Cent NO Converted | Weight Per Cent NO Converted to NH₃ [1] |
|---|---|---|---|
| 40 | 460 | 83.0 | 6.0 |
| 41 | 510 | 98.0 | 9.0 |
| 42 | 720 | 100 | 1.0 |

[1] Remainder converted to nitrogen

The above clearly shows that the metal ruthenates employed herein remain effective for their intended purposes even though the same has periodically been in contact with air and hydrogen.

That ruthenium which has been subjected to the action of air loses its effectiveness in converting nitrogen oxides to nitrogen is shown by the following series of experiments. Ruthenium metal was added to 1/16 inch diameter gamma alumina spheres having the following characteristics: 190 m²/gram surface area, 0.82 cc/gram pore volume, an average pore diameter of 185A and a density of 0.5 gram/cc by contacting such spheres with an aqueous solution of ruthenium chloride at atmospheric temperature and atmospheric pressure. The catalyst was then dried at a temperature of 250°C. for six hours and calcined at 900°F. for six hours. The catalyst contained 0.15 weight percent of ruthenium metal. A portion of this catalyst was exposed to air at a 1,000 GHSV for 12 hours at 1,650°F. The gaseous mixture used in Table VI was passed over a portion of the catalyst freshly prepared and over the portion that was exposed to air at a GHSV of 36,000 for a period of one-half hour. The results obtained are tabulated below in Table XII.

Table XII

| Exp. No. | Reaction Temperature °F. | Air Treatment | Weight Per Cent NO Converted |
|---|---|---|---|
| 43 | 600 | No | 100 |
| 44 | 600 | Yes | 31 |

Resort may be had to such variations and modifications as fall within the spirit of the invention and the scope of the appended claims.

We claim:

1. In a process wherein a mixture containing an exhaust gas from an internal combustion engine that includes nitrogen oxides, carbon monoxide and unburned hydrocarbons and added oxygen is passed over a first catalyst bed during the initial stages of operation of said internal combustion engine under an oxidizing atmosphere to oxidize said carbon monoxide and said unburned hydrocarbons and the treated mixture is then passed over a second catalyst bed containing an oxidation catalyst, upon continued operation of said internal combustion engine solely said exhaust gas from said internal combustion engine is passed over said first catalyst bed under a reducing atmosphere to convert said nitrogen oxides to nitrogen and the latter treated mixture and added oxygen are then passed over said second catalyst bed under an oxidizing atmosphere to oxidize said carbon monoxide and unburned hydrocarbons, the improvement which comprises employing as catalyst in said first catalyst bed a metal ruthenate selected from the group consisting of lithium, sodium, potassium, rubidium, cesium, calcium, strontium and barium ruthenates, said metal ruthenates exhibiting substantially no volatility during said initial stages of operation when said bed is under an oxidizing atmosphere.

2. The process of claim 1 wherein the metal ruthenate is defined by the formula $A_w M_x Ru_y O_3$, wherein A is a metal selected from the group consisting of lithium, sodium, potassium, rubidium, cesium, calcium, strontium and barium; M is a metal selected from the group consisting of titanium, zirconium, hafnium, tin, germanium, lead, manganese, tellurium, molybdenum, tungsten, cerium and praseodymium; $w$ is an integer from 1 to 4, $x$ from 0 to 8.9, $y$ from 0.1 to 9 and $z$ from 3 to 20.

3. The process of claim 2 wherein $w$ is from 1 to 2, $x$ is 0, $y$ is from 1 to 5 and $z$ is from 3 to 12.

4. The process of claim 2 wherein $w$ is from 1 to 2, $x$ is 0, $y$ is from 1 to 3 and $z$ is from 3 to 7.

5. The process of claim 1 wherein said metal ruthenate is barium ruthenate.

6. The process of claim 1 wherein said metal ruthenate is $BaRuO_3$.

7. The process of claim 1 wherein the amount of ruthenate employed is such that the ruthenium component thereof, as metal, is about 0.003 to about 0.5 Troy ounce per 1,000 cubic feet of gaseous mixture being treated per hour.

8. The process of claim 1 wherein the amount of ruthenate employed is such that the ruthenium component thereof, as metal, is about 0.008 to about 0.3 Troy ounce per 1,000 cubic feet of gaseous mixture being treated per hour.

9. The process of claim 1 wherein the amount of ruthenate employed is such that the ruthenium component thereof, as metal, is about 0.01 to about 0.2 Troy ounce per 1,000 cubic feet of gaseous mixture being treated per hour.

10. The process of claim 1 wherein the temperature is in the range of about 800° to about 1,400°F.

11. The process of claim 1 wherein the ruthenate is on a support.

12. The process of claim 1 wherein the ruthenate is on a support selected from the group consisting of alumina, silica, magnesia, thoria, titania, zirconia or mixtures thereof.

13. The process of claim 1 wherein the ruthenium is supported directly on a ceramic base or on a ceramic base carrying a refractory oxide.

14. The process of claim 1 wherein ruthenium is on a support and the exhaust gas is passed through the reaction zone at a gas hourly space velocity of about 8,000 to about 200,000.

15. The process of claim 1 wherein ruthenium is on a support and the exhaust gas is passed through the reaction zone at a gas hourly space velocity of about 10,000 to about 90,000.

16. The process of claim 1 wherein ruthenium is on a support in an amount of about 0.01 to about 10 weight percent.

17. The process of claim 1 wherein ruthenium is on a support in an amount of about 0.05 to about 1.0 weight percent.

18. The process of claim 1 wherein said oxidation catalyst is a Group VIII metal.

* * * * *